Dec. 22, 1970      R. E. DE COLA ET AL      3,550,105
BATTERY CONDITION INDICATOR
Filed Aug. 8, 1967

INVENTORS
RINALDO E. DECOLA
IRVING I. ZOOK
BY Hofgren, Wegner, Allen,
Stellman & McCord.

ATTORNEYS

United States Patent Office 3,550,105
Patented Dec. 22, 1970

3,550,105
BATTERY CONDITION INDICATOR
Rinaldo E. De Cola, Park Ridge, and Irving I. Zook, Skokie, Ill., assignors to Warwick Electronics Inc., a corporation of Delaware
Filed Aug. 8, 1967, Ser. No. 659,219
Int. Cl. G08b 21/00
U.S. Cl. 340—249      1 Claim

ABSTRACT OF THE DISCLOSURE

An oscillator converts a battery voltage into oscillations having an amplitude directly proportional to the battery voltage. The oscillations are rectified and coupled to an RC network, having a neon lamp connected in a relaxation oscillator circuit having a frequency related to the battery voltage. The neon lamp lights each time it conducts, flashing at a rate which is a function of the battery voltage.

---

This invention relates to an indicator for testing the condition of a battery.

It is often desirable to have an indication, prior to exhaustion, of the condition of a battery which powers electrical equipment. Such an indication is especially desirable when using rechargeable batteries, as manganese alkali batteries, in which too great a discharge may prove damaging. A battery condition indicator also aids in preventing the unexpected failure of electrical equipment, by indicating prior to exhaustion that the battery should be replaced or recharged.

This invention is an improvement over the battery condition indicator disclosed in a copending application of Per T. Overlie, entitled "Battery Condition Indicator," filed on even date with this application, and owned by the same assignee. In the Overlie battery condition indicator, an electronic switch, which forms a part of the resistive portion of an RC network charged by rectified oscillations, compares battery voltage with the voltage from a reference source. When the battery voltage drops below a predetermined value, the comparator switches to a high resistive state, causing the capacitive portion of the RC network to charge more slowly. This in turn decreases the rate at which a neon-glow lamp, connected across the capacitive portion, flashes or blinks, indicating that the battery should be replaced or recharged.

The present invention controls the rate at which a light source flashes solely by controlling the amplitude of voltage impressed across an RC network in accordance with battery voltage. Furthermore, the rate at which the light sources flashes or blinks is directly porportional to all battery voltages in excess of a predetermined minimum. As the flicker rate continuously decreases, rather then changing abruptly, the condition of the battery is apparent at all times and the need for recharge or replacement can be anticipated.

One object of this invention is the provision of an improved indicator for testing the condition of a battery.

One feature of this invention is the provision of a battery condition indicator using a circuit which converts low battery voltage into a high amplitude voltage for charging an electrical path including capacitor means. A visual indicator is connected to the capacitor means and has an output dependent upon the rate of charge of the capacitor means. The amplitude of the converted voltage forms the sole means for controlling the rate of charging of the capacitor means.

Another feature of this invention is the provision of a battery condition indicator having a flickering light output in which the rate of flicker is in continuous direct proportion to the voltage of the battery for voltages in excess of a predetermined minimum.

Further features and advantages of the invention will be apparent from the following description and from the drawings, in which.

Figure 1:
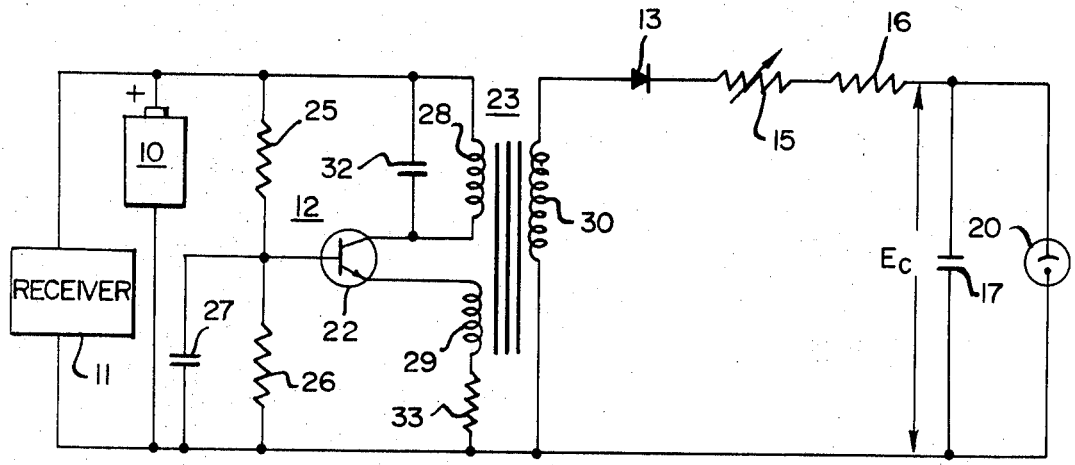
FIG. 1 is a schematic diagram of the battery condition indicator.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. Throughout the specifications, values and type designations will be given for certain of the components in order to disclose a complete, operative embodiment of the invention. However, it should be understood that such values and type designations are merely representative and are not critical unless specifically so stated. The scope of the invention will be pointed out in the appended claims.

In FIG. 1, a battery 10 powers an electrical circuit, as a radio receiver 11. The battery condition indicator consists of an oscillator 12 which converts the low amplitude (as 9 volts) battery voltage into AC oscillations having a high voltage value (as 120 volts RMS). The oscillations are rectified by a diode 13 and are coupled to an RC charging network, consisting of a series connected variable resistor 15, a 10 kilohm resistor 16, and a 0.05 microfarad capacitor 17.

A gas discharge device 20, in the form of a neon-glow lamp, type NE–2, is coupled directly across capacitor 17. When the voltage across capacitor 17 reaches the DC ignition potential of the gas discharge device, which is approximately 90 volts for a NE–2, the device is ignited, producing light output and also greatly reducing the internal impedance of the discharge device, thereby dissipating the charge across capacitor 17. As the charge is quickly dissipated, the voltage across discharge device 20 is no longer sufficient to maintain ignition, and the light output is extinguished. At the same time, the internal impedance rises to a high value, allowing capacitor 17 to recharge the ignition potential, causing another momentary light flash and discharge of the capacitor.

Gas discharge device 20 generates a flashing or blinking light output at a rate which is directly a function of the amplitude of the rectified voltage at diode 13, which in turn is a direct function of the amplitude of the voltage from oscillator 12. The oscillator includes NPN transistor 22 and a step-up transformer 23. The base of transistor 22 is coupled to a voltage divider network, consisting of a 10 kilohm resistor 25 and a 2.2 kilohm resistor 26 connected in series across battery 10. Resistor 26 is bypassed by a 1.0 microfarad capacitor 27.

Step-up transformer 23, which forms the feedback element for the oscillator, has a pair of primary windings 28 and 29, and a secondary winding 30 with a high turns ratio. Winding 28 is connected between the collector of transistor 22 and the positive output from battery 10 and is bypassed by a 0.1 microfarad capacitor 32. Winding 29, in series with a 47 ohm resistor 33, connects the emitter of transistor 22 to the negative terminal of battery 10. Secondary winding 30 is directly connected through rectifier diode 13 with the RC charging network formed by the series connection of resistors 15 and 16 and capacitor 17.

Figure 2:
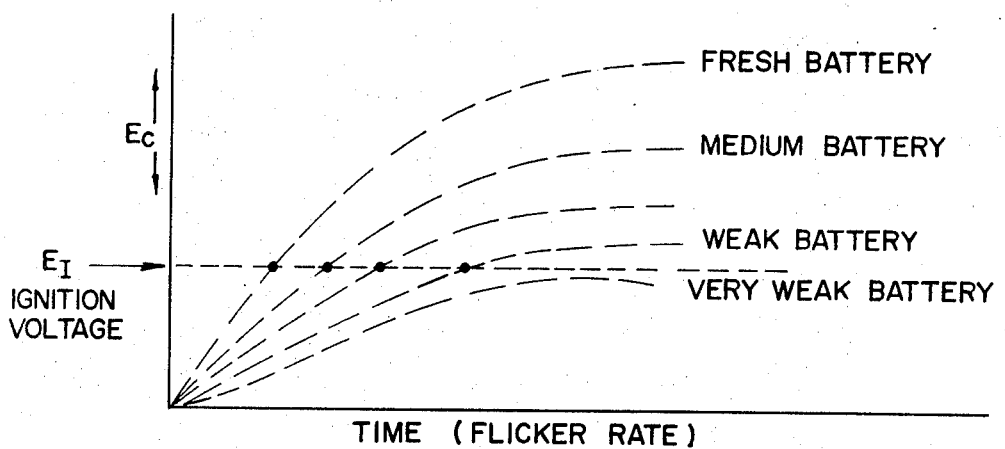
FIG. 2 is a family of capacitor charging curves for different battery potentials.

The step-up ratio of transformer 23 is chosen to provide AC oscillation across winding 30 which has an amplitude, as 120 volts RMS, which is in excess of the ignition voltage $E_I$ of the gas discharge device 20, as seen in FIG. 2. It should be noted that the DC battery voltage, as 9 volts, would be insufficient to charge the capacitor to the ignition voltage. The natural frequency of the high voltage oscillations is chosen to be as low as possible, in order to minimize RF interference with other electrical equipment, especially when battery 10 is powering a radio receiver. For a radio receiver 11 tuning the standard AM broadcast band, from 540 to 1640 kilocycles, a natural frequency of oscillations of approximately 2 kilocycles is satisfactory.

In operation, diode 13 rectifies the AC oscillations across winding 30 to produce a unidirectional voltage which charges capacitor 17 toward the ignition potential of the neon lamp. Upon ignition, the capacitor is discharged through the neon lamp, producing a light flash. The amplitude of AC oscillations across winding 30 is in direct proportion to the amplitude of DC voltage from battery 10. As the battery voltage drops the unidirectional voltage impressed across the RC network similiarly drops, thereby decreasing the rate at which the capacitor 17 is charged.

The result of the above operation can be seen in FIG. 2, where the voltage across capacitor 17, labeled $E_c$, is plotted versus time, for several values of battery voltage. When the voltage $E_c$ across the capacitor reaches the ignition potential $E_I$ of the gas discharge device, as shown by a horizontal dashed line, a flash of light is produced and the capacitor is discharged. The time constant of the RC network is adjusted by varying the resistance of resistor 15, FIG. 1, so that with a fresh or fully charged battery, the time necessary for the capacitor to charge to the ignition potential is small enough to produce a light output which rapidly flickers at a rate which is too high for the human eye to discern as individual bursts of light. As a result, the neon lamp will appear to be constantly energized.

As the battery voltage falls, a longer time period is necessary for the capacitor to charge to the ignition potential, reducing the flicker rate sufficiently so that individual light bursts become visible for a battery of medium strength. As the battery voltage is further reduced, the flicker rate becomes very slow, on the order of three or four flashes per second, providing a simple visual indication that the battery should be replaced or recharged soon thereafter.

Should this warning be disregarded or be unnoticed, the rate of flicker entirely ceases when the battery becomes very weak, since the voltage output from the oscillator 12 falls below the value of the ignition potential $E_I$ of the gas discharge device. At this time, capacitor 17 merely charges fully to the voltage from the oscillator, and remains in a static condition until the battery is replaced or recharged. The resulting complete cessation of the flashing light provides a readily understood indication that the battery is virtually exhausted, and, if of the rechargeable type, must be immediately charged to prevent permanent damage thereto.

While FIG. 2 illustrates the flicker rate for four given battery conditions, it will be apparent that the gas discharge device flashes or blinks continuously for all voltages in excess of a predetermined minimum. Furthermore, the rate of flicker at any given moment is directly proportional to the charge condition of the battery, and thus provides some measure of indication as to how far in the future replacement or recharging will be necessary.

I claim:
1. An indicator for the condition of a battery comprising:

a gas discharge tube having a predetermined ignition potential;

an electrical path including capacitor means for storing a charge;

an oscillator having an input and an output, said oscillator input being connectable to said battery for producing AC oscillations at said oscillator output, the amplitude of said AC oscillations being proportional to the battery voltage;

a step-up transformer having an input and an output;

means connecting said step-up transformer input to said oscillator output;

rectifier means coupling said step-up transformer output to said electrical path for charging said capacitor means with rectified AC oscillations; and means coupling said gas discharge tube across said capacitor means, said gas discharge tube emitting light energy and discharging said capacitor when the voltage across said capacitor means reaches said predetermined ignition potential of said gas discharge tube, whereby said gas discharge tube is caused to emit a flickering light output having a flicker rate which is a function of said battery voltage for battery voltages in excess of a predetermined minimum.

References Cited

UNITED STATES PATENTS

| 3,038,110 | 6/1962 | Paist | 340—249 |
|---|---|---|---|
| 3,173,073 | 3/1965 | Hetzler et al. | 340—249 |
| 3,234,538 | 2/1966 | Parke | 340—249 |
| 3,349,386 | 10/1967 | Zug | 340—331 |
| 2,255,637 | 9/1941 | Wright | 340—248 |
| 3,243,794 | 3/1966 | Phillips et al. | 340—248(D) |
| 3,311,779 | 3/1967 | Hartkorn, Jr. | 340—251X |
| 2,437,876 | 3/1948 | Cohn | 328—148X |
| 2,576,585 | 11/1951 | Fleming | 340—384(E) |

FOREIGN PATENTS

| 1,199,832 | 9/1965 | Germany | 340—249 |

ALVIN H. WARING, Primary Examiner

D. MYER, Assistant Examiner

U.S. Cl. X.R.

324—29.5; 331—64; 340—331